April 18, 1961 W. FREY 2,980,509
VAPOR PHASE PROCESS FOR THE PRODUCTION OF TITANIUM DIOXIDE
Filed Aug. 28, 1957

INVENTOR
Walter Frey

United States Patent Office 2,980,509
Patented Apr. 18, 1961

2,980,509

VAPOR PHASE PROCESS FOR THE PRODUCTION OF TITANIUM DIOXIDE

Walter Frey, Muttens, Switzerland, assignor to Fabriques de Produits Chimiques de Thann et de Mulhouse, Thann, France, a corporation of France Filed Aug. 28, 1957, Ser. No. 680,734

9 Claims. (Cl. 23—202)

The present invention relates to improvements of the process of a copending application, Serial No. 75,886, filed February 11, 1949, now U.S. Patent No. 2,823,982, for Production of Finely Divided Metal Oxides. The said copending application is concerned with the decomposition of volatile metallic chlorides, inter alia titanium tetrachloride, with oxygen-containing gases for the purpose of obtaining finely-divided metallic oxides, the decomposition being effected at high temperatures and under flame-producing conditions.

This application is a continuation in part of my copending application, Serial No. 187,926, filed October 2, 1950, now abandoned, and my copending application Serial No. 236,241, filed July 11, 1951, now abandoned.

The economic feasibility of the $TiO_2$ production by the vapor phase process depends largely on the possibility of reuse of the chlorine content of the employed titanium tetrachloride for producing new quantities of this raw material. For that reason, it is highly desirable to make use of an auxiliary reaction, i.e., an auxiliary flame, whose reactants and end products do not react either with the titanium tetrachloride or with the chlorine formed by the oxidation of the titanium tetrachloride.

In addition to reducing the possibility of recovering chlorine, the presence in the reaction gases of substantial quantities of hydrochloric acid, especially in conjunction with some residual humidity (which may be formed by partial oxidation of HCl by excess oxygen) creates a severe corrosion problem which must be dealt with, thus leading to the use of more expensive materials than would be necessary if only minute amounts of hydrochloric acid were present. And last, but not least, the $TiO_2$ pigment produced in gases containing substantial quantities of HCl adsorbs noticeable quantities of the acid, thus becoming strongly acid, i.e., unfit for direct use and needing a separate and expensive neutralization treatment, which latter generally impairs the pigmentary qualities of the product to some extent.

The foregoing considerations make it of paramount importance to carry out the above-mentioned process by the use of carbon monoxide as the auxiliary fuel gas. All hydrocarbon gases are to be excluded if maximum chlorine recovery is desired, since the hydrocarbons, like hydrogen gas, yield water on burning with oxygen, which water in turn reacts with the titanium tetrachloride to form titanium dioxide and hydrochloric acid.

Even when using carbon monoxide as the auxiliary flame-forming gas, however, difficulty has been encountered in keeping the process operating continuously for large scale production. On the one hand, when gases of normal moisture content are used for the auxiliary flame, the opening or orifice through which the reaction gas mixture enters the reaction chamber often becomes coated with deposits. These not only disturb the inflow of the mixture and finally impede it but also adversely affect the quality of the pigment obtained. On the other hand, when the auxiliary gases are dried completely before being introduced into the reaction chamber, it is difficult to keep a carbon monoxide flame burning regularly. While streams of dry oxygen and dry carbon monoxide may burn as a continuous flame when they are introduced by themselves alone, the flame becomes extinguished at once or very soon whenever the reaction gas mixture is introduced within this flame, i.e., surrounded by it.

In practical operations according to the examples of said application Serial No. 75,886 a further limitation is encountered in that it is not easy to control the particle size of the obtained $TiO_2$ pigment. In the case of a rutile pigment, the desired optimum particle size is approximately 0.3 micron. In the case of an anatase pigment, it is somewhat larger. In either case, a limited range of particle size distribution is desirable. To achieve these desired ends, however, has required variations of the concentration of $TiCl_4$ vapor in the reaction gas mixture, and these in turn affect the heat balance of the process and require variations of the proportions of the inflowing auxiliary gases.

The most valuable $TiO_2$ pigments are those which contain at least 90% of $TiO_2$ in the form of rutile. In order to obtain pigments of that character according to the aforesaid process, it has been necessary heretofore to carry out the process at very high reaction temperatures, e.g., of 1400° to 1600° C. At these high temperatures however, the pigment particles formed in the process tend to grow and to agglomerate by sintering, which results in a rutile material of low pigmentary value. In another respect, the use of the higher reaction temperatures, such as 1400° C. and more, is of little commercial interest since excessive amounts of carbon monoxide and oxygen are required in order to reach and maintain such high operating temperatures.

It is an object of the present invention to provide an improved vapor phase process for the production of titanium dioxide pigments. A particular object of the invention is to provide a continuous process for the preparation of $TiO_2$ pigments, which operates stably and reliably for long periods of time under practical operating conditions, without the formation of objectionable quantities of hydrochloric acid. Another object is to provide such a process in which the particle size of the pigment product is readily controlled. Still another important object of the invention is to provide such a process by which fine rutile is continuously produced at relatively low reaction temperatures.

According to the present invention, it has been discovered that the difficulties heretofore experienced through the formation of crusts or deposits on the inlet or inlets of the gaseous reaction mixture are caused by a small amount of water vapor which is normally present in the gas stream that flows in direct contact with the reaction gas stream where it enters the reaction chamber. This gas stream which first comes into contact with the reaction gas as it is discharged from the inlet is hereinafter denoted briefly as the "neighboring gas" or "adjacent gas." For normal moisture content of the adjacent gas, i.e., for example, a content of one to three percent by volume of water vapor, this water vapor reacts too quickly with the metal chloride vapor, that is, immediately on the emergence of the reaction gas mixture from the orifice of the inlet conduit or burner, so that the previously mentioned deposits form to obstruct the exit opening of the feed line for the reaction gas mixture.

It has been found that at moisture concentrations in the adjacent gas above certain critical limits, the water vapor contained therein reacts immediately and directly with the titanium tetrachloride vapor of the reaction gas coming in contact with it and thereby forms incrustations on the surfaces in the contact zone; whereas, at moisture concentrations below those limits any reaction products, such as titanium oxide, formed on contact between the reaction gas and the adjacent gas is precipitated in a finely divided form and is carried away from the contact zone with the gas stream into the reaction zone.

The highest allowable limit of the moisture content of the adjacent gas, above which formation of solid deposits on the discharge opening ensues, depends upon the exit or discharge velocities of the gas streams from the outlet tubes and to some extent upon the temperatures to which the reaction gas mixture and the adjacent gas are preheated. But even in the case of very great velocities of discharge of the reaction gas mixture, for example, over 50 meters per second, the highest allowable moisture content still remains below 0.2% per volume in the adjacent gas. Generally speaking, and especially for lower velocities of discharge as, for example, 20 to 5 meters per second and less, the limits are still lower, being about 0.05% by volume or lower. These figures are valid for reaction gas mixture and adjacent gas having temperatures of 100 to 300° C. and for concentric arrangement of the gas inlets or discharge openings. For higher discharge temperatures, especially of the reaction gas mixture, the upper limit for the moisture content of the adjacent gas is still lower. In all instances the process may be run for long periods of time, free from disturbances by deposit formation, when the moisture content of the adjacent gas is kept under 0.01% by volume.

In order to provide an adjacent gas having its moisture content within the specified low limit, it is necessary to use as the adjacent gas either a gas especially pre-dried for this purpose or a gas originally produced in a virtually bone dry condition, such, for example, as an oxygen gas of the type produced in an air liquefaction plant. The adjacent gas optionally may be either of the gases supporting the auxiliary flame, or it may be a separate further stream of an inert gas such as dry nitrogen or dry carbon dioxide. The drying of the gas to the required extent may be effected by known gas drying techniques, use being made of a moisture freezing process or of such drying agents as sulfuric acid, phosphorus pentoxide, silica gel, active aluminum oxide, or the like.

It has been further discovered, however, that the process cannot be operated satisfactorily by the apparently desirable technique of having all the auxiliary gases dried to completely anhydrous or "bone dry" condition. For example, when both the carbon monoxide and the oxygen containing gas contain less than 0.01% of moisture, a regularly burning flame is not likely to be obtainable. In order to maintain a constantly burning auxiliary carbon monoxide flame, the combustion of the carbon monoxide must be carried out in the presence of at least 0.01% by volume of water vapor based upon the total volume of the auxiliary reaction gases.

This minimum moisture content necessary to maintain the combustion of the carbon monoxide depends also on the issuing speeds of the carbon monoxide and the oxygen or oxygen containing gas and the quantity of carbon monoxide burned per unit of time. The larger the quantity of carbon monoxide so consumed, the less, proportionately, is the quantity of moisture needed to maintain the combustion. If, for example, several liters of carbon monoxide per minute are consumed with issuing speeds of one to two meters per second, at least about 0.03% by volume of moisture, calculated on the total volume of the auxiliary reaction gases, is needed. On the other hand, if several hundred liters of carbon monoxide per minute are consumed with the same issuing speed, then a flame can still be produced if there is present about 0.01% of water vapor by volume.

The combustion of the carbon monoxide can also be maintained by supplying a very small quantity of a moisture-forming gas, such as elementary hydrogen or gases containing hydrogen in bound combustible form, instead of being maintained by the presence of moisture originally supplied in the form of $H_2O$. The necessity quantity of such gas calculated as water vapor should then be at least as great as if the moisture were originally supplied in the form of $H_2O$. The term "moisture equivalent" is used herein to denote either moisture supplied in the form of $H_2O$ or moisture supplied by such a moisture-forming gas when it is burned in the reaction zone.

If carbon monoxide is the neighboring gas, it is practicable to bring in with the oxygen gas inflow the very small quantity of moisture equivalent necessary for maintaining the combustion, since this quantity is not sufficient to form an explosive mixture. When the adjacent gas is the oxygen containing gas, the necessary quantity of moisture equivalent for maintaining combustion can be supplied in the carbon monoxide gas. Small quantities of hydrogen or of gases containing bound hydrogen can also be supplied directly with the carbon monoxide or the oxygen containing gas even though it is the adjacent or neighboring gas.

When carrying out the process on an industrial scale, the auxiliary combustion is best done with the presence of from 0.005 to 0.10% or at most 0.25% by volume of moisture equivalent, calculated on the total volume of the auxiliary gases.

The oxygen gas supplied for the auxiliary combustion reaction can be introduced in stoichiometric quantities or also in excess. A certain portion of this oxygen, however, can be introduced already admixed with the reaction gas mixture and only the other portion of it introduced separately. Always, however, when igniting the reaction gas with an auxiliary flame sufficient oxygen must be introduced separately from the reaction gas mixture so that the reaction with the separately introduced inflammable gas forms an independently burning auxiliary flame. If, for example, no oxygen at all is introduced into the reaction chamber separately from the reaction gas mixture, then no auxiliary flame is formed as the inflammable gas does not enter into a flaming reaction with oxygen introduced in admixture with large quantities of metallic chloride vapor; in other words, such oxygen does not give an auxiliary flame with the fuel gas.

When carrying out the process as thus far described at low tempearture, as, for example, 920° C., a substantially all-anatase pigment is obtained, while at higher temperatures, say 1300° C., a pigment containing up to 70% rutile may be obtained. At still higher temperatures, the rutile content increases somewhat, but operation at such high temperatures is not commercially feasible due to the cost of the large quantity of carbon monoxide needed to reach these temperatures. Moreover, as the temperature increases, the mean particle size of the obtained pigment increases by far over the optimum range, thus rendering the product of low pigmentary value. This fact will be readily understood when considering that in the process as described herein there is less than enough water to have any nucleating effect that would regulate the number of the formed particles and in consequence their size.

I have discovered further that the control of the mean particle size in this virtually anhydrous process can be obtained quite effectively by adding a small quantity of a volatile silicon compound to the reaction gas mixture prior to its introduction into the reaction chamber, the said volatile silicon compound being of such nature as to be converted to silcon dioxide under the conditions of the $TiO_2$ forming reaction. It is an important feature of this discovery that the product so obtained is characterized by uniform particle size distribution and that the mean particle size can be effectively controlled within the desired pigmentary range of 0.2–0.5 micron. While the way in which the volatile silicon compound functions is not known with certainty, it appears to serve as a seeding agent during the formation of the $TiO_2$ and thus permits the production of the aforementioned uniform pigment particles within the desired range of size. In this way not only water with its undesirable side reactions can be avoided as nucleating agent but also a more uniform action of the particle size controlling agent is secured because this agent—the volatile silicon compound—is homogeneously distributed throughout the reaction gas mixture prior to any reaction. Thus, the size controlling agent is present at the same concentration in every part of the reaction gas mixture and can uniformly perform its function as soon as the reaction temperature is reached in any point of the reaction gas mixture without being dependent on the performance of a mixing device. This cannot be the case with water as nucleating agent, since water cannot be premixed with titanium tetrachloride without it reacting with it instantly even at ordinary temperature.

In addition to its controlling action on the particle size of the obtained titanium dioxide, the presence of the volatile silicon compound strongly biases the reaction towards the anatase modification of $TiO_2$, and does so even at higher reaction temperatures. This property is of interest if production of anatase pigment is desired, but it is a serious detriment when one desires to obtain a $TiO_2$ pigment of the more valuable rutile form.

It has been discovered, however, that the presence of a small amount of a volatile aluminum compound homogeneously premixed with the titanium tetrachloride containing reaction gas acts as a powerful rutile promoter even at relatively low temperatures and in the absence of water vapor. The choice of the useful volatile aluminum compound is, however, limited to those compounds which are converted to aluminum oxide under the reaction conditions prevailing in the process. In the absence of added aluminum compound in the reaction gas mixture, it is very difficult to obtain a $TiO_2$ pigment having higher than 70% rutile content, regardless of the reaction temperature employed. On the contrary, in the presence of a volatile aluminum compound premixed with the reaction gas, it is easy to obtain $TiO_2$ pigments having a rutile content of more than 90% and up to substantially all rutile at economically feasible temperatures such as, for example, 1100° to 1200° C. Unfortunately, the presence of aluminum compounds in the reaction gas favors the formation of relatively coarse particles leading to a pigment whose mean particle size is out of the optimum range and having, therefore, a somewhat low tinting strength.

The further discovery has been made, however, that the rutile promoting effect of volatile aluminum compounds is much stronger than the anatase promoting effect of silicon compounds, yet that aluminum compounds have substantially no disturbing action on the $TiO_2$ particle size controlling properties of volatile silicon compounds, when both additives are jointly premixed with a titanium tetrachloride containing reaction gas mixture which is reacted by contacting it with an independent auxiliary flame. In other words, it is possible according to this discovery to obtain continuously at commercially practicable reaction temperatures a $TiO_2$ pigment having both a high rutile content and a controlled fine particle size, when addition is made to the reaction gas mixture of adequate amounts of both a volatile silicon compound and a volatile aluminum compound capable of being converted to $SiO_2$ and $Al_2O_3$, respectively, under the described reaction conditions.

It is advantageous to employ volatile aluminum and silicon compounds which are in the vapor state under the conditions in which the reaction gas mixture is used. The addition of small amounts of the silicon compound is sufficient to appreciably decrease the particle size of the product. Ordinarily, an amount of silicon compound is employed such that the $TiO_2$ product contains about 0.1–5% by weight of $SiO_2$. For most purposes, however, it will be found that 0.5 to 2% by weight of $SiO_2$ is sufficient to obtain the desired particle size distribution. On the other hand, while amounts of silicon compound in excess of 5%, based on the $TiO_2$ content of the product, may be employed, these excessive amounts may have a disadvantageous effect because they tend to suppress to a certain degree the formation of rutile $TiO_2$. A high enough amount of volatile aluminum compound therefore has to be added to overcome this influence.

The amount of volatile aluminum compound to be added in order to get a rutile content of about 90% and more by weight depends to some extent on the particular procedures used for carrying out the decomposition. In general, it is sufficient, in order to reach the maximum rutile content, to use such an amount of aluminum compound that the titanium dioxide obtained contains 0.1%–10%, but preferably 0.5 to 3%, by weight of aluminum oxide.

Of course, where anatase is desired no aluminum compound is added to the reaction gas mixture, so that full advantage can be taken of both the particle size controlling effect and the anatase promoting effect of the added silicon compound.

In order to produce a rutile pigment, however, it is also important that the amounts of aluminum compound and of silicon compound be correlated according to the conditions of the reaction. As a general rule, the ratio of aluminum oxide to silicon dioxide in the product should be from about 3:1 to 1:1. However, the most favorable ratio depends on the chosen reaction conditions and must in each case be determined by routine experiments.

Aluminum compounds which may be employed as rutile-promoting agent according to the present invention may be inorganic in character, as for example an aluminum halide such as aluminum chloride, or they may be organic in character, as, for instance, trimethyl aluminum, etc. Advantageously, the volatile aluminum compound is employed in vaporized form.

Volatile silicon compounds which may be employed as the particle size controlling agent include, for instance, silicon halides such as silicon tetrachloride ($SiCl_4$), silicon hexachloride ($Si_2Cl_6$), silicon terabromide, silicon chloroform ($SiHCl_3$), etc. While silicon compounds of organic character may be used, for instance, a silicon ester such as silicon tetraethylester $[Si(OC_2H_5)_4]$ or organic silicanes such as chloromethylsilicane ($SiH_2CH_3Cl$), dimethylsilicane $[SiH_2(CH_3)_2]$, tetraethylsilicane $$[Si(C_2H_5)_4]$$

etc.: compounds of this character are disadvantageous in the process because objectionable quantities of hydrochloride acid form in the reaction atmosphere when they are used.

When volatile aluminum halide compounds, such as anhydrous aluminum chloride, are added to the titanium tetrachloride vapor, the addition can be done in such a way that a fixed amount of solid aluminum chloride is dissolved in the liquid titanium tetrachloride to be vaporized. According to the concentration of the dissolved aluminum chloride, there is then obtained a definite concentration of aluminum chloride in the titanium tetrachloride vapor. The highest concentration of aluminum chloride can be obtained when a titanium tetrachloride solution is used which was saturated, when hot, with aluminum chloride. The concentration of the aluminum in the vapor over a solution of $TiCl_4$ saturated with it amounts to, according to the temperature of the $TiCl_4$, from 0.5 to 1.5% by weight of titanium tetrachloride. Alternatively, a solution of aluminum chloride in hot titanium tetrachloride may be flash vaporized to give a vapor mixture having the same composition as the liquid solution. But the aluminum chloride can also be added to the titanium tetrachloride vapor or to the titanium tetrachloride vapor-oxygen mixture separately by subliming the $AlCl_3$ either directly from an auxiliary vessel or, still better, by preparing it only shortly before the addition to the titanium tetrachloride vapor. In the latter case, it is advantageous to pass chlorine gas, alone or in admixture with diluent, over heated metallic aluminum, for example, in the form of shavings, and then to combine the reaction product, consisting of aluminum chloride vapor and, in some cases, inert gas, with the titanium tetrachloride vapor or the titanium tetrachloride-oxygen gas mixture. Aluminum oxide may be used instead of metallic aluminum; in such case use is made of a mixture of CO and $Cl_2$ or phosgene for the chlorination; or use can be made of a mixture of aluminum oxide and carbon and the chlorination carried out with elemental chlorine.

The aluminum halide added should preferably have a very low content of ferric halide. If the ferric halide content is too high, the produced titanium dioxide will be off color and light-sensitive due to small amounts of iron oxide being formed out of the ferric halide vaporized together with the aluminum halide. To prevent a disadvantageous discoloration, the aluminum halide should contain less than 1%, and preferably less than 0.1%, by weight of ferric halide.

Since anhydrous silicon tetrachloride is miscible in all proportions with titanium tetrachloride, when silicon tetrachloride, as silicon-containing compound, is mixed with aluminum chloride for the formation of rutile, a liquid mixture of the three chlorides can be obtained directly.

Such a ternary liquid mixture of predetermined composition may be flash vaporized to produce a vapor mixture having the same weight percent composition as the ternary liquid mixture. If such flash vaporization is done in the presence of the adequate amount of oxygen containing gas one obtains directly the desired reaction gas mixture. But silicon tetrachloride vapor can also be added in the same way as in the case of aluminum chloride by mixing the titanium tetrachloride vapor or the titanium tetrachloride vapor-oxygen mixture, aluminum chloride and silicon chloride vapors one after the other or jointly, depending upon whether one vaporizes the liquid silicon chloride separately, or prepares the silicon chloride from silicon and chlorine directly before mixing it with the $TiCl_4$.

It is important in the feed of the reaction mixture to maintain the components in vaporous condition. Preferably, therefore, according to the invention the vaporous mixture is further heated to a temperature somewhat in excess of the dew point of the $TiCl_4$. $TiCl_4$ vapor ordinarily condenses at about 136° C. but this condensation point will vary under the influence of additional gases such as the concentrations of oxygen and diluent gases. It is important to heat the reaction mixture sufficiently high to prevent condensation of any of its constituents. This prevents any droplets of $TiCl_4$ from entering the reaction zone, which droplets would be thermally decomposed at a much slower rate than the gaseous components and thus would result in the formation of coarse rutile $TiO_2$ particles which are nonpigmentary in character. The practical maximum to which the reaction mixture is preheated according to the present invention is about 500° C., whereby premature oxidation of the $TiCl_4$ is avoided.

It is very important in the practice of the present invention that the reaction gas mixture contain at least 50% of the oxygen necessary for the conversion of the titanium tetrachloride to titanium dioxide and of the added aluminum and/or silicon compounds to the corresponding oxides. This condition is essential for the production of a $TiO_2$ pigment of fine and very uniform grain since it allows the reaction to start homogeneously as soon as the necessary temperature is reached in any part of the reaction gas mixture. In order to take full advantage of the homogeneous reaction it is desirable to premix in the reaction gas the stoichiometric quantity or even better a surplus of twenty to fifty percent or more of the oxygen necessary to convert the titanium tetrachloride to titanium dioxide. In every case the total amount of oxygen introduced in the reaction chamber, i.e., that contained in the reaction gas mixture plus the separately introduced oxygen must be at least sufficient to convert the titanium chloride, and the added volatile silicon and aluminum compounds to the corresponding oxides and to burn the carbon monoxide to carbon dioxide. In some cases it may be of advantage to add to the reaction gas mixture a diluent gas in conjunction with the oxygen. The more dilute reaction mixture so obtained results in formation of $TiO_2$ pigment of smaller particle size than would be the case with undiluted reaction gas mixtures. The various diluent gases may be used, provided they do not react with the other constituents of the reaction gas mixture. So use can be made of nitrogen, carbon dioxide or chlorine, etc. Obviously the oxygen containing gas and the diluent gas (if any) must be rendered substantially moisture free before being admixed with the anhydrous metal chloride vapors.

In carrying out the decomposition of the titanium tetrachloride-oxygen mixture, it is important to control the feed rate of the reaction mixture to insure that complete decomposition thereof is effected within the area of the auxiliary combustion reaction. To this end, a maximum linear flow rate of 50 meters per second insures complete decomposition of the reaction mixture while preventing excessive titanium dioxide crystal growth. If this maximum rate of flow is exceeded, a portion of the reaction mixture may pass beyond the combustion zone and a part of the titanium tetrachloride may be oxidized still in the gaseous phase but in the presence of already formed titanium dioxide crystals. This results in crystal twinning and particle growth to such an extent that the product is non-uniform and unfit for use as a pigment.

Another important feature of the present invention is the control of the reaction temperature. This temperature is regulated by the amount of combustible gas, i.e., carbon monoxide, used for the formation of the auxiliary flame and also to a certain extent by the introduction of diluent gases into the reaction chamber. The molecular ratio of carbon monoxide to titanium tetrachloride is preferably adjusted within the range of 0.25 to 1 mol of CO per mol of $TiCl_4$.

The combustion of the CO leads to very high flame temperatures of more than 1500° C. and up to 2000° C. Thus the ambient temperature around the flame is sufficiently high such that the gaseous reaction mixture is rapidly heated to the high temperatures which are necessary to start the reaction between the metal chlorides and oxygen.

When producing anatase pigment the reaction temperature will advantageously be in the range of 800 to 1200° C. and preferably between 900 and 1000° C. At temperatures of less than 800° it is difficult to insure complete conversion of the titanium tetrachloride to the dioxide thus leading to poor yields and to the presence of undesirable oxychlorides in the product. Reaction temperatures over 1200° C. are of no interest since the increased cost for the necessary CO is not compensated by any advantage when producing anatase pigment.

For the production of titanium dioxide having a rutile content of over 90% a reaction temperature in the range of 1000 to 1600° C. and preferably 1000 to 1300° C. is necessary. At temperatures below 1000° C. the formation of the rutile crystalline modification is too slow to become complete even in the presence of several percents of aluminum compounds in the reaction gas. On the other hand, apart from the economic factors, at temperatures over 1300° C., coarse particles begin to form and at still higher temperatures, say over 1600° C., titanium dioxide begins to dissociate thus leading to badly discolored product. In normal operation of the process according to this invention a reaction temperature of 1100° to 1200° C. is sufficient to insure the production of substantially all rutile $TiO_2$.

When measuring the reaction temperature, care must be taken to avoid measurement within the combustion zone of the carbon monoxide as the temperature therein may locally far exceed the true reaction temperature. Good measure is made in the atmosphere ambient to the outer surface of the auxiliary flame and in the immediate neighborhood thereto. Alternatively the temperature may be measured within the mixed reaction products of the auxiliary flame and of the reaction gas mixture at some distance from the reactant inlets.

By using purified metallic chlorides containing only very slight amounts of iron and vanadium chlorides, a $TiO_2$ pigment of pure white color is obtained by the method of the present invention. The color and tinting strength characteristics of the product are considerably improved over the $TiO_2$ pigments prepared according to the commercially accepted sulfuric acid or hydrochloric acid hydrolysis of titanium solutions.

The specific procedures hereinbefore described are particularly useful when it is desired to insure a maximum chlorine recovery, since the presence of water can be almost entirely avoided in the reaction. Thus, the reaction products contain only traces of hydrochloric acid. In typical large scale embodiments of the present process the quantity of water necessary for the smooth burning of the auxiliary flame is as low as 0.20% by volume calculated on the total volume of all the gases entering the reaction chamber, thus leading to approximately 0.04% hydrochloric acid in the exit gases, which figure corresponds to a chlorine loss of less than 0.1% calculated on the theoretical amount of chlorine to be recovered. In contrast, if the process were operated with as much as 1% by volume of water vapor in the reaction atmosphere, this amount of water would lead to a final hydrochloric acid content of nearly 2% by volume calculated on the total volume of the exit gases, which would greatly complicate the recovery of reaction products and would entail a chlorine loss of 5% approximately. It must be understood, however, that the presence of water in the present process does not disturb the reaction itself; so this process can work even in the presence of amounts of water as high as 1% calculated on the total volume of the entering gases and vapors, provided the moisture content of the adjacent gas is kept lower than the upper limit herein disclosed. Of course, when substantial amounts of water are present in the reaction there is formed a substantial quantity of hydrochloric acid; hence one of the major advantages of the present process is thus lost.

This process can be carried out with the use of readily available apparatus. The apparatus shown diagrammatically in the accompanying drawings is suitable for practicing the invention. It will be understood, however, that other suitable forms of apparatus may be used equally as well. In the drawings.

Figure 1:
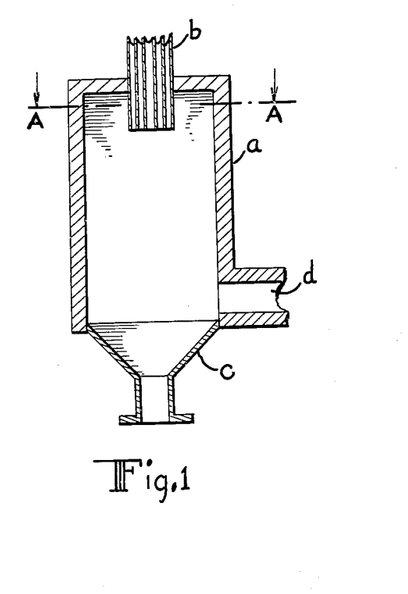
Figure 1 is a diagrammatic vertical longitudinal section through a reaction chamber suitable for carrying out the invention.

As shown in Figure 1, a suitable apparatus for carrying out the process of the invention consists in general of a reaction chamber $a$ formed of heat insulated walls which may be heated externally and a gas supply system and burner generally designated by $b$ which consists of a plurality of pipes forming annular passageways or conduits for the introduction of the gases into the reaction chamber. The apparatus also contains a funnel $c$ for discharging titanium dioxide precipitated from the gases and outlet $d$ for the by-product reaction gases which, due to their content of metal oxide, may advantageously be conducted into a dust extracting plant (not shown).

Figure 2:
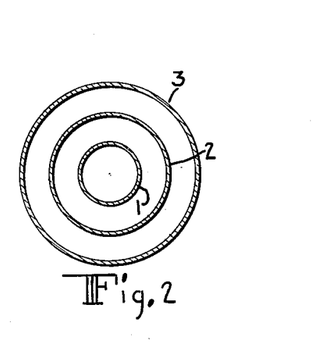
Figure 2 is a horizontal cross section along line A—A of Figure 1 showing the concentric tubes and intervening annular passageways used as conduits to feed the gases into the reaction chamber and discharge them into the combustion zone.

As shown in Figure 2, $b$ is a horizontal section of a conduit system for the introduction of gases to be reacted, consisting of three concentric tubes 1, 2 and 3. The reaction gas mixture can be fed through tube 1 and one of the auxiliary reaction components through the passageway between tubes 1 and 2 and the other auxiliary gas component in the passageway between tubes 2 and 3. For example, the reaction gas mixture is introduced through tube 1, carbon monoxide having a moisture content within the maximum limits defined by this invention through the passageway between tubes 1 and 2, and an oxygen gas through the passageway between tubes 2 and 3.

Figure 3:
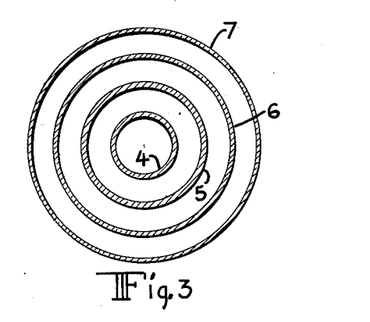
Figure 3 is a similar horizontal cross sectional view of another embodiment of the gas feeding device.

As shown in Figure 3, the gas feeding device $b$ consists of four concentric tubes. In the operation of this device the innermost tube 4 can be used for feeding a reaction gas mixture, the annular passageway between tubes 4 and 5 for feeding an inert gas having a moisture content within the maximum limitation specified by this invention, the annular passageway between tubes 5 and 6 for one of the auxiliary reaction gases and the annular passageway between tubes 6 and 7 for the other auxiliary reaction gas.

Figure 4:
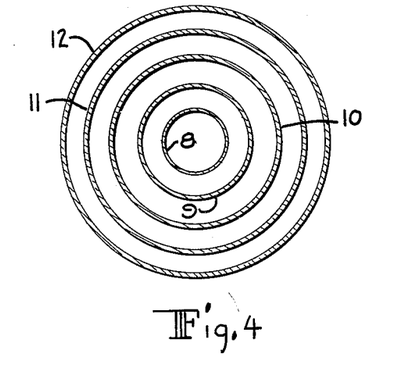
Figure 4 is another similar horizontal cross sectional view of a further modification in the gas feeding device.

As shown in Figure 4, the gas feeding device $b$ consists of five concentric tubes forming concentric annular passageways or conduits which may be utilized for the practice of the invention. In the operation of this embodiment carbon monoxide may be fed through the central tube 8, and oxygen containing gas through the annular passageway between tubes 8 and 9, a reaction gas mixture through the annular passageway between tubes 9 and 10, carbon monoxide through the annular passageway between tubes 10 and 11 and an oxygen containing gas through the annular passageway between tubes 11 and 12. In this particular embodiment the oxygen conducted through the annular passageway between tubes 8 and 9 and the carbon monoxide conducted through the annular passageway between tubes 10 and 11 must contain a moisture content within the maximum limitation specified by this invention. The sequence by which the oxygen containing gas and the combustible gases are fed into the reaction chamber may be varied provided the adjacent gases contain a moisture content within the maximum limitation specified by this invention.

Figure 5:
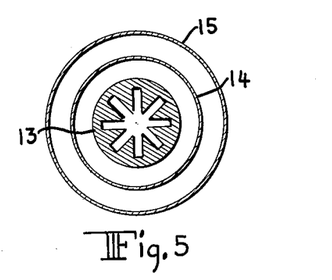
Figure 5 is still another similar horizontal cross sectional view of an additional modification of the gas feeding device.

As shown in Figure 5, the gas feeding device $b$ comprises a central core member provided with a series of radially arranged small slits 13 cut out of the core member and extending longitudinally therethrough, each slit having a breadth of about 1 cm. or less. The radially arranged slits form a star-like figure and serve for the introduction of the reaction gas mixture of metal chloride and oxygen containing gas. Two concentric tubes, 14 and 15, surround the central core member rod and form annular passageways which may be used for the introduction of the auxiliary reaction gases; for instance, the passageway between tubes 14 and 15 may be used for feeding oxygen and the other passageway between rod 13 and tube 14 for feeding carbon monoxide having a moisture content within the maximum specified hereinbefore.

The following examples further illustrate the process of the invention and its utilization in the apparatus described. Unless otherwise stated, percentages are by volume and the indicated volumes and exit velocities are expressed as NTP, i.e., assuming the gases or vapors were at 0° C. temperature and at a pressure of 760 mm. mercury column.

*Example 1*

In this example a reaction chamber as shown in Figure 1 is used with a burner or gas feeding device as shown in Figure 2.

The following quantities of reactants are discharged per unit time into the reaction chamber:

(a) Through the central tube 1: a mixture of 100 volumes titanium tetrachloride, 3 volumes of aluminum chloride, 2 volumes of silicon tetrachloride, 130 volumes of pure dry oxygen and 100 volumes of dry nitrogen. This mixture is obtained by flash vaporizing liquid hot titanium tetrachloride containing dissolved therein, 2.1% $AlCl_3$ and 1.8% $SiCl_4$ by weight within a stream of the indicated amount of nitrogen and adding the oxygen to this mixture. The reaction gas mixture is then brought to a temperature of 200° C. before being introduced in the reaction chamber;

(b) Through the annular passageway between tube 1 and 2: 45 volumes of pure oxygen having a moisture content of less than 0.01% by volume; and (c) Through the annular passageway between tube 2 and 3: 90 volumes of 90% carbon monoxide containing 0.1% by volume of water vapor (balance being $CO_2$ and $N_2$).

The reaction chamber is heated up by first introducing the auxiliary gas streams of oxygen and carbon monoxide, igniting them to form a flame and thus bring the chamber to red heat. Then the reaction gas mixture is introduced in the auxiliary flame whereby it is vigorously ignited and decomposed producing a $TiO_2$ pigment having a rutile content of over 90% and a tinting strength better than 1600, the mean particle size being about 0.35 micron. During the continuous decomposition a reaction temperature of 1150° C. is maintained by regulating, if necessary, the amount of the introduced carbon monoxide and of the separately introduced oxygen. The process can be run for several days without formation of noticeable deposits on the reaction gas inlet.

*Example 2*

In this example a reaction chamber is used as shown in Figure 1 in combination with a burner as shown in Figure 4. The concentric tubes used have the following dimensions:

| | Mm. |
|---|---|
| Central tube 8 | 5 to 7 |
| Tube 9 | 9 to 11 |
| Tube 10 | 13 to 15 |
| Tube 11 | 17 to 19 |
| Tube 12 | 21 to 23 |

Through central tube 8 pure $O_2$ is fed with an exit velocity of 65 cm. per second. The oxygen contains 0.08 percent by volume of steam.

Through the annular passageway between tubes 8 and 9, CO gas with a moisture content less than 0.01 percent by volume is fed with an exit velocity of 100 cm. per second.

Pure CO gas with the same moisture content but with an exit velocity of 150 cm. per second is likewise fed through the intervening annular passageway between tubes 10 and 11.

Pure $O_2$ with a steam content of 0.08 percent per volume is fed between tubes 11 and 12 with an exit velocity of 60 cm. per second.

After these four gas streams had been ignited to a flame, a mixture of $TiCl_4/AlCl_3/SiCl_4/O_2$ and $Cl_2$ was fed through the annular passageway between tubes 9 and 10 with an exit velocity of 10 meters per second. This reaction gas mixture contained 100 volumes of $TiCl_4$, 1.5 volumes of $AlCl_3$, 0.8 volume of $SiCl_4$, 125 volumes of $O_2$ and 130 volumes of $Cl_2$. Before the reaction gas mixture is introduced into the reaction chamber it is heated up to about 150° C. The temperature of the furnace is maintained at about 1200° C.

In the operation of this example a $TiO_2$ is obtained without difficulty with a rutile content of 98 percent and a tinting strength of 1650. The mean particle size of the obtained rutile pigment lies between 0.2 and 0.3 micron. However, when the moisture content of the CO is raised to 0.05 percent by volume after two hours of operation a deposit forms on the orifices of the tubes, the tinting strength of the $TiO_2$ drops to 1500, the rutile content to 80 percent, and after an additional two hours the process must be interrupted due to a stoppage of the tubes.

When the moisture content of the $O_2$ is lowered below 0.08 percent by volume, for instance to 0.01 percent by volume, a good burning CO flame is obtained before the introduction of the $TiCl_4$ mixture, but as soon as the mixture is introduced the auxiliary flame burns intermittently and most often becomes extinguished after a short time. After the auxiliary flame is extinguished $TiO_2$ is no longer obtained which is suitable for pigment purposes. However, if the production of $TiO_2$ is increased to several kilograms per hour with a retention of the discharge velocities and volume ratios but with corresponding alterations in the dimensions of the burner, the moisture content of the $O_2$ can be lowered to below 0.08 percent by volume, for instance to about 0.02 percent by volume, without the auxiliary flame being extinguished and without there being any deterioration in the quality of the product.

*Example 3*

In this example a reaction chamber is used as disclosed in Figure 1 and a burner as disclosed in Figure 5.

The burner as used consists of a central core having a diameter of 40 mm. with eight radial slits having a breadth of 3 mm. and a length of 15 mm. The surrounding tube 14 has an inside diameter of 44 mm. and an outside diameter of 45 mm., while the tube 15 has an inside diameter of 52 mm. and an outside diameter of 55 mm.

Through the radial slits in the central core 13, a gaseous mixture containing 60 liters of $TiCl_4$, 100 liters of $O_2$, 60 liters of $N_2$, 1.2 liters of $AlCl_3$ and 0.6 liter $SiCl_4$ is fed to the reaction chamber per minute.

Through the annular passageway between the central core 13 and the tube 14, 80 liters of CO are fed per minute with a moisture content of 0.001 percent by volume.

Through the annular passageway between tubes 14 and 15, 40 liters per minute of $O_2$ are fed. This oxygen was supplied from an air liquefaction plant and was moistened prior to its introduction in the reaction chamber by contacting it with ice cold water so as to get a moisture content of 0.2% by volume.

The temperature of the reaction chamber near the flame was maintained at about 1220° C. The process was operated continuously to produce $TiO_2$ having a rutile content of about 98 percent and a constant tinting strength of about 1650. The mean particle size of the obtained pigment was about 0.3 micron, with substantially no particles exceeding 0.6 micron.

The reaction mixture for carrying out the process was obtained by flash vaporizing at 200° C. titanium tetrachloride containing by weight 0.9% silicon tetrachloride, at a rate of 510 gr. per minute within a stream of 50 liters per minute of nitrogen. 10 liters per minute of nitrogen mixed with 1.8 liters of dry chlorine are passed over aluminum metal maintained at 200° C. within a separate reactor. The so obtained nitrogen-diluted aluminum chloride vapor is mixed with the flash-vaporized titanium tetrachloride containing the complementary nitrogen, and finally the 100 liters per minute of oxygen preheated to about 100° C. is added thereto.

On stopping the supply of aluminum chloride vapor the pigment obtained, while still of very fine texture, has a tinting strength of only about 1500, its rutile content being of no more than about 40%. When, on the other hand, no silicon tetrachloride is added to the titanium tetrachloride the obtained pigment, while still being substantially all rutile, shows a tinting strength of less than 1600, its mean particle size being nearly 1 micron with a rather wide size distribution ranging up to several microns.

Example 4

In this example a reaction chamber as shown in Figure 1 is used with a burner or gas feeding device as shown in Figure 2.

The following gases and quantities of gases are discharged per unit time into the reaction chamber:

(a) Through the central tube 1 a gaseous mixture of 100 volumes $TiCl_4$, 5 vol. silicochloroform ($SiHCl_3$), 95 volumes of pure dry oxygen and 125 volumes dry air is discharged at a velocity of 10 meters per second and at a temperature of 140° C.;

(b) Through the annular passage between tube 1 and 2; 65 volumes of pure carbon monoxide having a moisture content of less than 0.01% by volume is discharged at a velocity of 2 meters per second; and (c) Through the annular passage way between tubes 2 and 3, 35 volumes of oxygen having a moisture content of 0.2% by volume is discharged at a velocity of 1 meter per second.

The process is initiated by introducing first the auxiliary gas streams of oxygene and carbon monoxide and igniting them to form a flame. When the reaction chamber has been heated to red heat the reaction gas mixture is discharged within the auxiliary flame whereby it is burned continuously. The temperature within the reaction zone is regulated to 900° C. by varying, if necessary, the inflow rate of the gases of the auxiliary flame.

In a continuous thermal decomposition $TiO_2$ consisting of about 95 percent of anatase, having a tinting strength of 1250, is produced. Its mean particle size is about 0.3 micron.

Example 5

In this example a reaction chamber as shown in Figure 1 is used with a burner or gas feeding device as shown in Figure 3.

Through the central tube 4 a gas mixture of 100 volumes of $TiCl_4$, 5 volumes of $SiCl_4$, 130 volumes of $O_2$ and 100 volumes of $N_2$ are discharged at a velocity of 4 meters per second and at a temperature of 150° C. Through the passageway between tubes 4 and 5, 50 volumes of $N_2$ having a moisture content of 0.005% by volume is discharged with a velocity of 5 meters per second; through the passageway between tubes 5 and 6 a mixture consisting of 100 volumes of CO and 100 volumes of $N_2$ with a water vapor content of 0.05% by volume is discharged at a velocity of 2 meters per second; and through the passageway between tubes 6 and 7, 50 volumes of $O_2$ with a steam content of 0.1 percent by volume is discharged at a velocity of 1 meter per second. The temperature of the reaction chamber is maintained at 850 or 900° C.

In a continuous thermal decomposition $TiO_2$, consisting of nearly all anatase, having a tinting strength of 1250, is produced. Nearly all the pigment particles are within the range from 0.1 to 0.5 micron in diameter. If the $N_2$ conducted through the passageway between tubes 4 and 5 is used with a moisture content of 0.05%, after about 1½ hours a deposit forms at the orifice at the end of tube 4. After about an additional 1½ hours it is necessary to interrupt the operation of the process due to stoppage of the tube. Moreover the product produced towards the end of the operation shows a tinting strength of only about 1050 to 1100.

In the operation of this example like results can be obtained if dry $CO_2$ is substituted for $N_2$ in the gas stream fed through the annular passageway between tubes 4 and 5.

Example 6

In this example a reaction chamber is used as disclosed in Figure 1 and a burner as disclosed in Figure 5.

The burner as used consists of a central core having a diameter of 40 mm. with eight radial slits having a breadth of 3 mm. and a length of 15 mm. The surrounding tube 14 has an inside diameter of 44 mm. and an outside diameter of 45 mm. while the tube 15 has an inside diameter of 52 mm. and an outside diameter of 55 mm.

Through the radial slits in the central rod 13 a gaseous mixture containing 30 liters of $TiCl_4$, 50 liters of $O_2$, 30 liters of $N_2$, 0.6 liter of $AlCl_3$ and 0.3 liter of $SiCl_4$ are fed to the reaction chamber per minute at a temperature of 120° C. Through the annular passageway between the central rod 13 and the tube 14, 40 liters of CO are fed per minute with a moisture content of 0.001 percent by volume and through the annular passageway between tubes 14 and 15, 20 liters per minute of $O_2$ are fed with a hydrogen content of 0.15 percent by volume and a moisture content of less than 0.1 percent. The temperature of the reaction chamber near the flame was maintained at about 1200° C.

In a continuously operating process $TiO_2$ is obtained with a rutile content of about 98 percent and a constant tinting strength of about 1650.

In the process of this example, however, should the moisture content of the CO gas be increased to 0.1 percent by volume, after several hours a deposit of $TiO_2$ forms at the burner opening and the tinting strength of the $TiO_2$ falls to 1400 and below. After an additional period of time it becomes necessary to interrupt the operaiton.

Example 7

A gas mixture of 4.5 parts of bromine vapor and 10 parts of $N_2$ are passed over pure aluminum at 600° C. The aluminum bromide vapor that forms is added to a reaction gas which consists of 100 parts of titanium tetrachloride vapor, 0.5 part of $SiCl_4$ vapor, 180 parts of $O_2$ and 140 parts of $N_2$. This mixture is heated to a temperature of 150° C. and is then led to a reaction chamber suitable for carrying out the process of the invention, for example a reaction chamber $a$ as shown on the accompanying sheet of drawings.

The said reaction gas mixture is fed down through the central conduit of the three concentric tubes or conduits (Fig. 1) constituting the supply device $b$, by any suitable and conventional means, at such a rate that it enters the reaction chamber $a$ at an influent linear rate of about 500 centimeters per second.

Bone dry carbon monoxide is supplied through the intermediate conduit of the three concentric conduits and pure oxygen containing 0.15% water vapor by volume is fed in through the outermost conduit. The linear influent rate of the carbon monoxide and of the oxygen, i.e. the rate of flow thereof into the reaction chamber, is about 200 centimeters per second. About 150 parts of CO are supplied per 75 parts of pure oxygen.

The combustible gas mixture and oxygen are preferably supplied at normal or slightly elevated temperature (e.g. 100 to 200° C.) and are preferably ignited, with the aid of conventional mechanical ignition means if necessary, before starting the introduction of the reaction gas mixture ($TiCl_4$, $AlBr_3$, $SiCl_4$, $O_2/N_2$) with production of a flame a short distance in front of the outlet from the central conduit. Thereupon the reaction mixture is also introduced into the reaction chamber, the feed of CO and $O_2$ being maintained so that the CO flame surrounds the inflowing gas stream of reaction mixture. The atmosphere ambient to the flame is maintained at a temperature of about 1200° C. The reaction gas mixture coming from the central conduit passes into the decomposition zone constituted by the aforesaid flame and decomposition with formation of $TiO_2$ pigment with about 1.9% $Al_2O_3$, about 0.35% $SiO_2$, a rutile content of 95% and a particle size of about 0.5 micron takes place.

Example 8

To a still, a warm solution of 2.2% by weight of aluminum chloride (containing less than 0.1% $FeCl_3$) and 1.2% by weight of silicon chloride in titanium chloride is fed continuously. The still is kept at a temperature of about 105° C. and pure oxygen is bubbled continuously through this solution. To 2.5 volumes of the vaporous mixture preheated afterwards to 150° C., 1.5 volumes of nitrogen preheated to 150° C. are added. For the decomposition, an ignition device is employed wherein the supply device b consists of five concentric tubes (Fig. 4) and a reaction chamber a as shown in Fig. 1. The sizes of the concentric tubes are as follows: Tube 8, 20 to 22 millimeters; tube 9, 26 to 29 millimeters; tube 10, 39 to 42 millimeters; tube 11, 52 to 55 millimeters; and tube 12, 60 to 64 millimeters. Through the central tube 8 is fed, 18 liters per minute of CO; through the passage between tubes 8 and 9, 9 liters per minute of $O_2$; through the passageway between tubes 9 and 10, 160 liters per minute of the chloride/oxygen/nitrogen mixture; through the passage between tubes 10 and 11, 40 liters per minute of CO; and, in the outermost passage between tubes 11 and 12, 20 liters per minute of oxygen. The gases fed directly next to the titanium chloride mixture, i.e., the gases fed through the passage between tubes 8 and 9 and through the passage between tubes 10 and 11 have a moisture content of at most 0.1 gram of $H_2O$ per cubic meter. To ensure the burning of the CO-flame, the carbon monoxide flame is ignited before starting the introduction of the chloride mixture and is kept burning as long as the mixture is fed to the chamber. The temperature ambient to the flame is kept at 1200° C. A very uniform $TiO_2$ with a particle size of about 0.3 micron, a color value of 108 and a tinting strength of 1650 is continuously produced. The gases loaded with the pigmentary titanium dioxide are withdrawn by an exhaust opening and freed from the titanium dioxide by a Cottrell dust extracting apparatus.

The practice of this invention has been exemplified herein by various details and illustrative embodiments. It will be understood, however, that the details may be varied widely and that substitutions, additions or omissions can be made without departing from the scope or spirit of the invention which is intended to be defined by the appended claims.

What is claimed is:

1. In a process for producing a finely divided titanium dioxide pigment, comprising continuously flowing into a reaction zone and anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.05% of moisture by volume and so little moisture as to prevent oxide incrustations on the reaction mixture inlet, yet maintaining in said auxiliary gases a total moisture equivalent of at least 0.005% of their volume to keep said carbon monoxide flame burning, said total moisture equivalent being maintained at not more than 0.25% of the volume of said auxiliary gases to limit to a minute amount the HCl content of the reaction products.

2. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.01% of moisture by volume to prevent oxide incrustations on the reaction mixture inlet, yet maintaining in said auxiliary gases a total moisture equivalent of at least 0.005% of their volume to keep said carbon monoxide flame burning, said total moisture equivalent being maintained at not more than 0.1% of the volume of said auxiliary gases to limit to a minute amount the HCl content of the reaction products.

3. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.05% of moisture by volume and so little moisture as to prevent oxide incrustations on the reaction mixture inlet, yet maintaining in said auxiliary gases a total moisture equivalent of at least 0.005% but not more than 0.25% of their volume to keep said carbon monoxide flame burning and limit to a minute quantity the HCl content of the reaction products, supplying in said reaction mixture as the sole reactive additive thereto an added volatile oxidizable silicon compound in an amount sufficient to yield from 0.1 to 5% by weight of $SiO_2$ in said pigment, and reacting said mixture at a temperature of 800° to 1200° C. to produce an anatase pigment of very fine particle size.

4. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.05% of moisture by volume and so little moisture as to prevent oxide incrustations on the reaction mixture inlet, yet maintaining in said auxiliary gases a total moisture equivalent of at least 0.005% but not more than 0.25% of their volume to keep said carbon monoxide flame burning and limit to a minute quantity the HCl content of the reaction products, supplying in said reaction mixture as the sole reactive additive thereto an added silicon chloride in an amount sufficient to yield from 0.5 to 2% by weight of $SiO_2$ in said pigment, and reacting said mixture at a temperature of 900° to 1000° C. to produce an anatase pigment of very fine particle size.

5. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.05% of moisture by volume and so little moisture as to prevent oxide incrustations on the reaction mixture inlet, yet maintaining in said auxiliary gases a total moisture equivalent of at least 0.005% but not more than 0.25% of their volume to keep said carbon monoxide flame burning and limit to a minute quantity the HCl content of the reaction products, supplying in said reaction mixture an added volatile oxidizable silicon compound and an added volatile oxidizable aluminum compound in amounts respectively sufficient to yield from 0.1 to 5% of $SiO_2$ and 0.1 to 5% of $Al_2O_3$ in said pigment, and reacting said mixture at a temperature of 1000° to 1600° C. to produce a pigment of very fine particle size containing over 90% of rutile.

6. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.05% of moisture by volume and so little moisture as to prevent oxide incrustations on the reaction mixture inlet, yet maintaining in said auxiliary gases a total moisture equivalent of at least 0.005% but not more than 0.25% of their volume to keep said carbon monoxide flame burning and limit to a minute quantity the HCl content of the reaction products, supplying in said reaction mixture an added silicon chloride and added aluminum chloride in amounts respectively sufficient to yield from 0.5 to 2% of $SiO_2$ and from 0.5 to 3% of $Al_2O_3$ in said pigment, and reacting said mixture at a temperature of 1000° to 1300° C. to produce a pigment of very fine particle size containing over 90% of rutile.

7. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.01% of moisture by volume to prevent oxide incrustations on the reaction mixture inlet, yet maintaining in said auxiliary gases a total moisture equivalent of at least 0.005% of their volume to keep said carbon monoxide flame burning, said total moisture equivalent being maintained at not more than 0.1% of the volume of said auxiliary gases to limit to a minute amount the HCl content of the reaction products, supplying in said reaction mixture as the sole reactive additive thereto an added silicon chloride in an amount sufficient to yield from 0.5 to 2% by weight of $SiO_2$ in said pigment, and reacting said mixture at a temperature of 900° to 1100° C. to produce an anatase pigment of very fine particle size.

8. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.01% of moisture by volume to prevent oxide incrustations on the reaction mixture inlet, yet maintaining in said auxiliary gases a total moisture equivalent of at least 0.005% of their volume to keep said carbon monoxide flame burning, said total moisture equivalent being maintained at not more than 0.1% of the volume of said auxiliary gases to limit to a minute amount the HCl content of the reaction products, supplying in said reaction mixture an added silicon chloride and added aluminum chloride in amounts respectively sufficient to yield from 0.5 to 2% of $SiO_2$ and from 0.5 to 3% of $Al_2O_3$ in said pigment, and reacting said mixture at a temperature of 1000° to 1300° C. to produce a pigment of very fine particle size containing over 90% of rutile.

9. In a process for producing a finely divided titanium dioxide pigment, comprising continuously flowing into a reaction zone an anhydrous gaseous reaction mixture of vaporized titanium tetrachloride and oxygen containing gas, continuously flowing thereinto auxiliary gases including separate streams of carbon monoxide and oxygen containing gas respectively surrounding the inflowing reaction mixture and maintaining an auxiliary flame around said mixture in said zone by burning said carbon monoxide therein, thereby reacting said mixture in contact with said flame to form said pigment; the improvement which comprises supplying as the stream of auxiliary gas next adjacent to said inflowing mixture a dry gas containing less than 0.05% of moisture by volume and so little moisture as to prevent oxide incrustations on the reaction mixture inlet, yet maintaining in said auxiliary gases a total moisture equivalent of at least 0.005% of their volume to keep said carbon monoxide flame burning, said total moisture equivalent being maintained at not more than 0.25% of the volume of said auxiliary gases to limit to a minute amount the HCl content of the reaction products, supplying in said reaction mixture an added volatile oxidizable silicon compound and an added volatile oxidizable aluminum compound in amounts respectively sufficient to yield in said pigment from 0.1 to 5% of $SiO_2$ and from 0.1 to 5% of $Al_2O_3$ with the $SiO_2$ and the $Al_2O_3$ present in a weight ratio of between 1:1 and 1:3 in said pigment, and reacting said mixture at a temperature of 1000° to 1600° C. to obtain a pigment of very fine particle size containing over 90% of rutile.

References Cited in the file of this patent
UNITED STATES PATENTS

| | | |
|---|---|---|
| 2,488,439 | Schaumann | Nov. 15, 1949 |
| 2,559,638 | Krchma et al. | July 10, 1951 |
| 2,779,662 | Frey | Jan. 29, 1957 |

UNITED STATES PATENT OFFICE
CERTIFICATE OF CORRECTION

Patent No. 2,980,509                          April 18, 1961

Walter Frey

It is hereby certified that error appears in the above numbered patent requiring correction and that the said Letters Patent should read as corrected below.

Column 9, line 24, for "0.20%" read -- 0.02% --; column 10, line 14, for "carton" read -- carbon --; column 13, line 27, for "oxygene" read -- oxygen --; column 14, line 32, for "operaiton" read -- operation --; column 15, line 52, for "and" read -- an --.

Signed and sealed this 19th day of September 1961.

(SEAL)
Attest:

ERNEST W. SWIDER
Attesting Officer

DAVID L. LADD
Commissioner of Patents

USCOMM-DC